United States Patent
Davis et al.

(10) Patent No.: US 8,827,527 B1
(45) Date of Patent: Sep. 9, 2014

(54) THIN MULTIMODE TABLET BACKLIGHT

(75) Inventors: Joshua V. Davis, Marion, IA (US); Steven W. Kramer, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 49 days.

(21) Appl. No.: 13/599,466

(22) Filed: Aug. 30, 2012

(51) Int. Cl.
*F21V 7/04* (2006.01)
*F21V 9/04* (2006.01)

(52) U.S. Cl.
USPC .......................... 362/612; 362/613; 362/622

(58) Field of Classification Search
USPC ......... 362/602, 608, 609, 611, 612, 613, 621, 362/622, 627, 293
See application file for complete search history.

(56) References Cited

U.S. PATENT DOCUMENTS

| | | | | |
|---|---|---|---|---|
| 5,211,463 | A * | 5/1993 | Kalmanash | 362/613 |
| 2008/0151141 | A1* | 6/2008 | Huang et al. | 362/612 |
| 2010/0149834 | A1* | 6/2010 | Kim et al. | 362/613 |
| 2011/0080754 | A1* | 4/2011 | Wang | 362/613 |

* cited by examiner

*Primary Examiner* — Y My Quach Lee
(74) *Attorney, Agent, or Firm* — Donna P. Suchy; Daniel M. Barbieri

(57) ABSTRACT

A multimode edge-light configured for providing reduced depth and improved multimode edge uniformity is provided. The multimode edge-light may be suitable for sun light readability and use with night vision goggles. The multimode edge-light includes a support base and a first and second set of light-emitting diode (LED) modules electronically connected to the support base. The first set of LED modules is positioned adjacent to the light guide, and the second set of LED modules is positioned separate from the light guide. The multimode edge-light also includes an infrared filter configured for filtering light from only the second set of LED modules positioned on a surface of the support base. In operation of the multimode edge-light, at least a portion of the first set of LED modules and at least a portion of the second set of LED modules are selectively energized for providing a plurality of operation modes.

18 Claims, 5 Drawing Sheets

THIN MULTIMODE TABLET BACKLIGHT

TECHNICAL FIELD

The present disclosure relates generally to backlights for displays and more particularly to an edge-lit type of backlight that is suitable for use in a variety of operation modes.

BACKGROUND

Flat panel displays, such as those used in tablet computer products, may pose challenges when used in a range of environments. For example, when using a display in full sunlight, it can be difficult to have enough brightness on the display to make it readable by a user. It may be necessary to run the device at max power in order to read it in direct sunlight, which depletes the device's battery life. This can be especially problematic for tablet liquid crystal displays that are meant for ruggedized environments.

Similarly, some displays also require compatibility with night vision imaging systems (NVIS). For instance, certain avionics and/or ground vehicle displays not only need to be visible to unaided eyes, but also need to be compatible with night vision equipment (e.g., night vision goggles) without adversely affecting the operation of the night vision equipment. Traditional NVIS compatible displays using light emitting diode (LED) backlights in a thin form factor such as a tablet may present problems with luminance limitations as well as color uniformity issues.

Therefore, there exists a need for improved systems and methods for illuminating a display in an ultra-thin format that is compatible with a broad range of environments.

SUMMARY

The present disclosure is directed to a multimode edge-light configured for directing light to a light guide. The multimode edge-light includes a support base, a first set of light-emitting diode (LED) modules electronically connected to the support base, and a second set of LED modules electronically connected to the support base. The first set of LED modules is positioned in close proximity adjacent to the light guide, and the second set of LED modules is positioned further away from the light guide, enough so to accommodate a filter. The multimode edge-light also includes a filter configured for filtering light from only the second set of LED modules positioned on a surface of the support base. In operation of the multimode edge-light, at least a portion of the first set of LED modules and at least a portion of the second set of LED modules are selectively energized for providing a plurality of operation modes.

The present disclosure is also directed to a multimode edge-light for illuminating a tablet display. The multimode edge-light includes a support base, a light guide, a first set of side emitting light-emitting diode (LED) modules electronically connected to the support base and a second set of side emitting LED modules electronically connected to the support base. The first set of side emitting LED modules is located adjacent to the light guide and the second set of side emitting LED modules is offset away from the light guide. The multimode edge-light also includes a filter positioned on a surface of the support base correlating to the second set of side emitting LED modules. The filter is configured for filtering light from the second set of side emitting LED modules only. The first set of side emitting LED modules and the second set of side emitting LED modules are positioned on the support base to provide a uniform illumination across an edge of the tablet display in a plurality of operation modes.

The present disclosure is also directed to a method for backlighting a display. The method includes the step of providing a first array of light-emitting diode (LED) modules positioned adjacent to a light guide. The method also includes the step of providing a second array of LED modules positioned further back from the light guide. A further step of the method includes filtering light from the second array of LED modules when the second array of LED modules is energized. Another step of the method involves selectively energizing at least one of the first array of LED modules and the second array of LED modules for providing: a first operation mode where the first array of LED modules is energized and a second operation mode where only the second array of LED modules is energized.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a backlight for a display. The backlight is an edge-lit type of backlight that is suitable for use in a variety of operation modes. The multimode edge-light may be used to provide backlighting to a display, such as a tablet display. The multimode edge-light includes two sets of LEDs to provide a multiple operation modes. The first set of the LEDs may be located adjacent to a light guide that forms part of the display. The second set of LEDs may be located further away from the light guide.

The multimode edge-light may be configured so that the second set of LEDs is filtered to provide a night vision compatible mode of operation. The first set of LEDs is unfiltered and not energized during night vision compatible modes of operation. In day mode operation, the first set of LEDs may be energized to illuminate the display efficiently providing optimal daylight-compatible brightness without the spectral filtering hindrance of the night compatible mode. Both sets of LEDS (or portions thereof) may also be energized to provide enhanced brightness during daylight operations.

Figure 1:
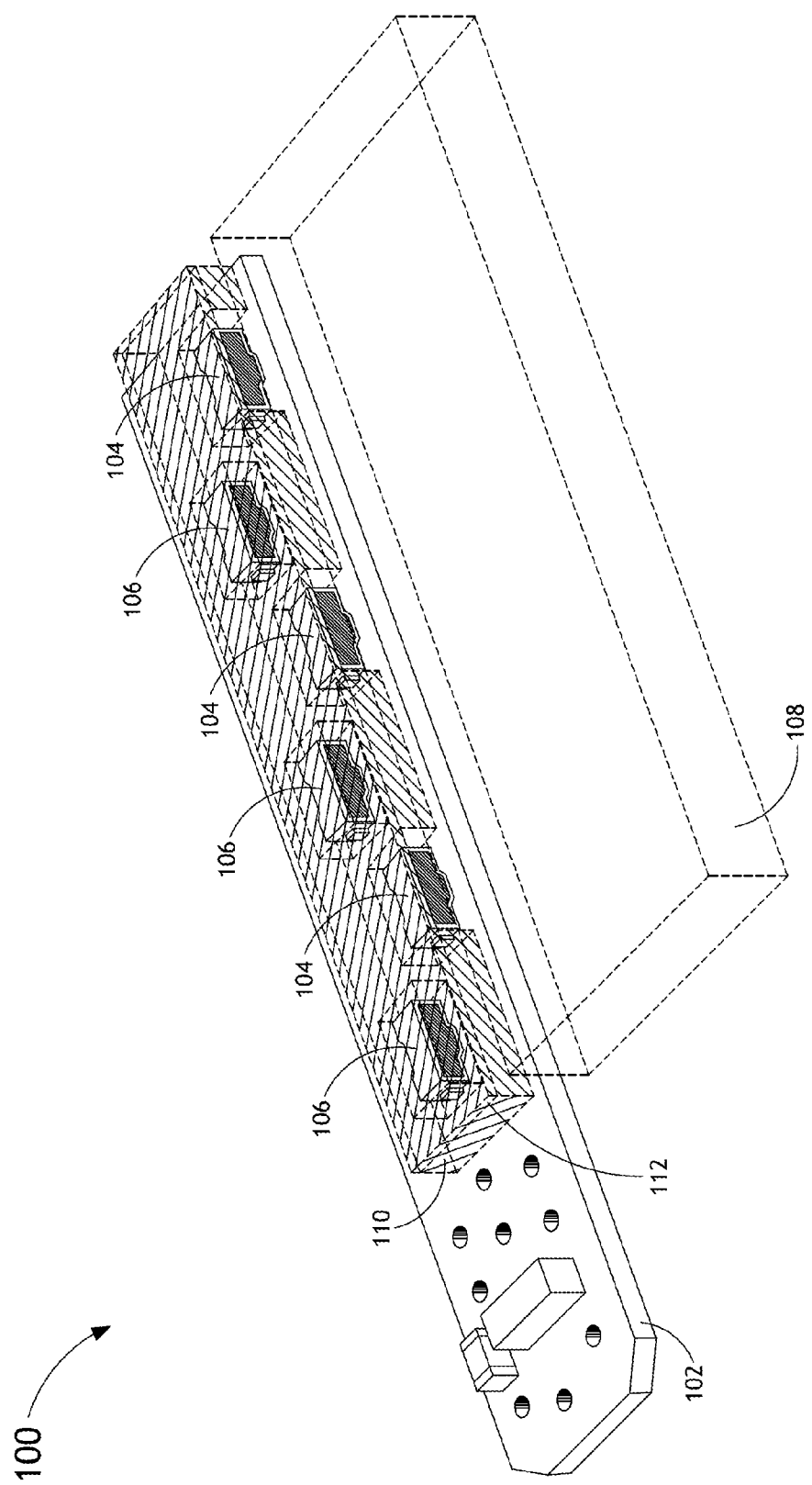
FIG. 1 is a partial isometric view illustrating a multimode edge-light in accordance with the present disclosure.
Figure 2:
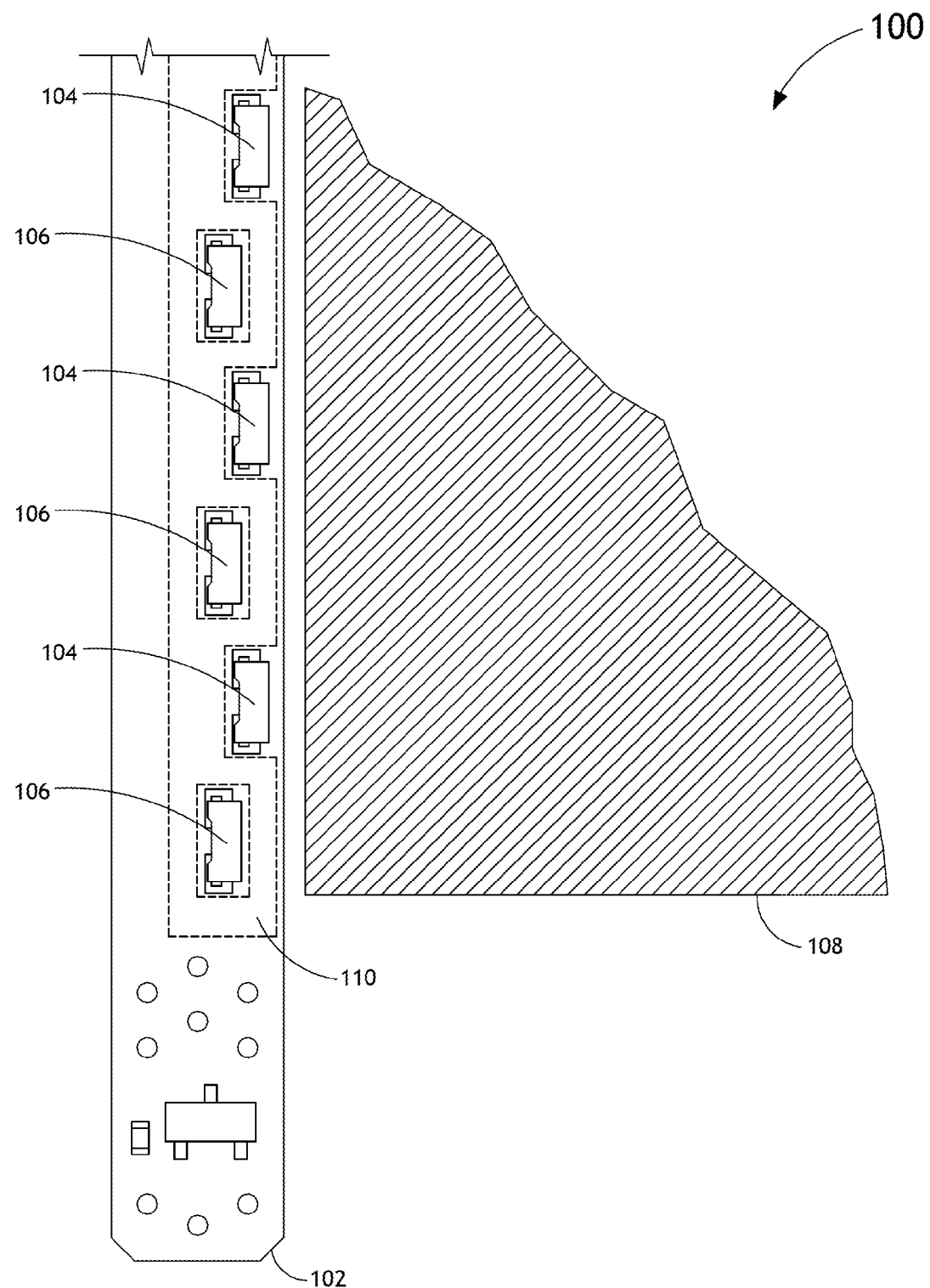
FIG. 2 is an aerial view of the multimode edge-light shown in FIG. 1.

Referring generally to FIGS. 1 and 2, a multimode edge-light 100 in accordance with the present disclosure is provided. FIG. 1 is a partial isometric view illustrating the multimode edge-light 100 and FIG. 2 is an aerial view of the multimode edge-light 100 shown in FIG. 1. The multimode edge-light 100 may include a support base 102 for supporting and providing electrical connections for a first set of light-emitting diode (LED) modules 104 electronically connected to the support base 102, as well as a second set of LED modules 106 electronically connected to the support base 102. The multimode edge-light 100 may be configured to provide light to a light guide 108 located adjacent to the support base 102. The multimode edge-light 100 includes a filter 110 positioned on a surface of the support base 102. The filter 110 is configured for filtering light from the second set of LED modules 106. The multimode edge-light 100 may also include a film for providing light leak prevention for the first set of LED modules 104 and the second set of LED modules 106. When using the multimode edge-light 100, at least a portion of the first set of LED modules 104 and at least a portion of the second set of LED modules 106 are selectively energized for providing a plurality of operation modes to the multimode edge-light 100.

The support base 102 may include a metal core circuit board, a printed circuit board (rigid or flexible) or the like for providing electrical power as well as control information to the LED modules.

The filter 110 of the multimode edge-light 100 is positioned on a surface of the support base 102 and adjacent to the light guide 108 in one embodiment. The filter 110 provides filtering of the second set of LED modules 106 during night vision compatible operations. The filter 110 may be a Night Vision Imaging System (NVIS) filter of an absorptive variation or a dichroic thin film filter. The filter 110 may also be formed of a combination of these two types, or made from any other material suitable for providing filtering of light. The filter 110 may be configured to effectively attenuate the near infrared wave-lengths of light required for NVIS operation.

The filter 110 may be configured to define a plurality of notches linearly distributed along the support base 102 to provide an opening for each module of the first set of LED modules 104. In this manner, the filter 110 may surround each module of the second set of LED modules 106 but does not filter or interfere with the light from the first set of LED modules 104. Alternatively, the filter 110 may also include apertures or openings for the first set of LED modules 104 instead of notches. The use of notches and apertures provides independent filtering of the second set of LED modules 106 for reduction of infrared emissions without subjecting the light from the first set of LED modules to filtering losses.

The first set of LED modules 104 is located adjacent to the light guide 108. Positioning the first set of LED modules 104 adjacent to the light guide 108 facilitates efficient optical coupling of the light emitted from each module of the first set of LED modules 104 into the light guide 108. The second set of LED modules 106 is positioned generally separate from the light guide 108 and not immediately adjacent to the light guide 108. Offsetting the second set of LED modules 106 away from the light guide 108 results in less efficient optical coupling. This is acceptable because the second set of LED modules 106 is configured for operation in night mode when the required brightness levels are lower than during the day mode. The loss in efficiency of optical coupling of the second set of LED modules 106 to the light guide 108 by offsetting the second set of LED modules 106 can be advantageous in that it frees up space along the edge of the support base 102 and the light guide 108. This space may be used for additional LED modules, benefiting the day mode operation in particular. Similarly, offsetting the second set of LED modules 106 can provide improved edge uniformity along the multimode edge-light 100.

The exact positioning of the second set of LED modules 106 relative to the light guide 108 is calibrated to provide adequate optical coupling to provide a required luminance level for night mode operations, while maximizing the use of the limited space along the edge of the light guide 108 and along the length of the support base 102. Similarly, the position of the second set of LED modules 106 and the first set of LED modules 104 is calibrated to provide desired edge uniformity across the multimode edge-light 100.

The multimode edge-light 100 may also include some combination of optical enhancement films located between the light guide 108 and either the first set of LED modules 104, or the second set of LED modules, or both in some arrangement of films to optimize light control and coupling into the light guide.

The height of the filter 110 may be equal to or greater than the height of the LED modules 104 and 106, providing an elevated and generally uniform surface for additional layers/substrates that may need to be placed on top of the filter 110. The filter 110 is configured to absorb and/or prevent light leaks from the second set of LED modules 106. The notches in the filter 110 for the first set of LED modules 104 are dimensioned based on the physical size of the first set of LED modules 104 to provide independent filtering of the second set of LED modules 106 without subjecting the first set of LED modules 104 to filtering losses.

The multimode edge-light 100 may be arranged so that the filter 110 is in contact with the light guide 108. Similarly, the filter 110 may be near but separate from the light guide 108, or the filter 110 may overlap a portion or all of the light guide 108.

The multimode edge-light 100 may also include a film 112 shown in FIG. 1 positioned on top of the filter 110 and covering both sets of LED modules. The film 112 provides protection against light leakage from the LED modules. For example, the film 112 may help prevent light leakage from the LED modules along the edge of the multimode edge-light 100 and help to maximize the light that is guided towards the light guide.

Each LED module of the first set of LED modules 104 and the second set of LED modules 106 may include one or more individual LEDs. For example, each LED module may include one high efficiency single die white LED, multiple autonomously packaged white light LEDs, or a singular white LED component with internal multi-die structure. The LED modules of the first set 104 and the second set 106 may be the same, or each set may include different LED modules. It is also contemplated that either the first set of LED modules 104 or the second set of LED modules 106 may include color LED modules, or a mixture of color LED modules and white LED modules. For example, either the first set 104 or the second set 106 may include multiple discrete emitters of varying color including, but not limited to, red, green, blue, yellow or white emitters. The color LED modules may include either closely spaced discrete component groupings or they may be comprised of multiple discrete emitter dies hosted within an integrated singular physical component package. Either variant of multi-color LED assembly would retain independent electrical drive capability for any of its individual color emitter die.

Each LED module of the first set of LED modules 104 and the second set of LED modules 106 may include side emitting LEDs. Historically, the use of side emitting LEDs has been challenging as they may not provide the same levels of brightness as top firing LEDs. In the current disclosure, it has been found that the use of side emitting LEDs provides adequate levels of brightness in multiple operation modes. The independent filtering of the second set of LED modules 106 and not the first set of LED modules 104, as well as the placement of the first set 104 immediately adjacent to the light guide 108 with the second set positioned further away from the light guide (enough to insert filtering material) helps to increase the day mode luminance to a desired level while providing luminance sufficient for night mode performance without compromising edge uniformity for the backlight.

Selectively activating/energizing the first set of LED modules 104 or the second set of LED modules 106 may provide different modes of operation. For example, the second set of LED modules 106 may be energized in order to provide a night vision compatible mode of operation. That is, the second set of LED modules 106 may provide illumination so that the display is not only visible to unaided eyes, but also compatible with night vision equipment (e.g., night vision goggles) without adversely affecting the operation of the night vision equipment. On the other hand, the first set of LED modules 104 may be energized to provide illumination suitable for relatively bright operation conditions (e.g., in daylight or when sufficient ambient lights are available). Additionally, a portion of or all of the modules of the second set of LED modules 106 may be energized simultaneously with the first set of LED modules 104 to provide an enhanced day mode.

Figure 3:
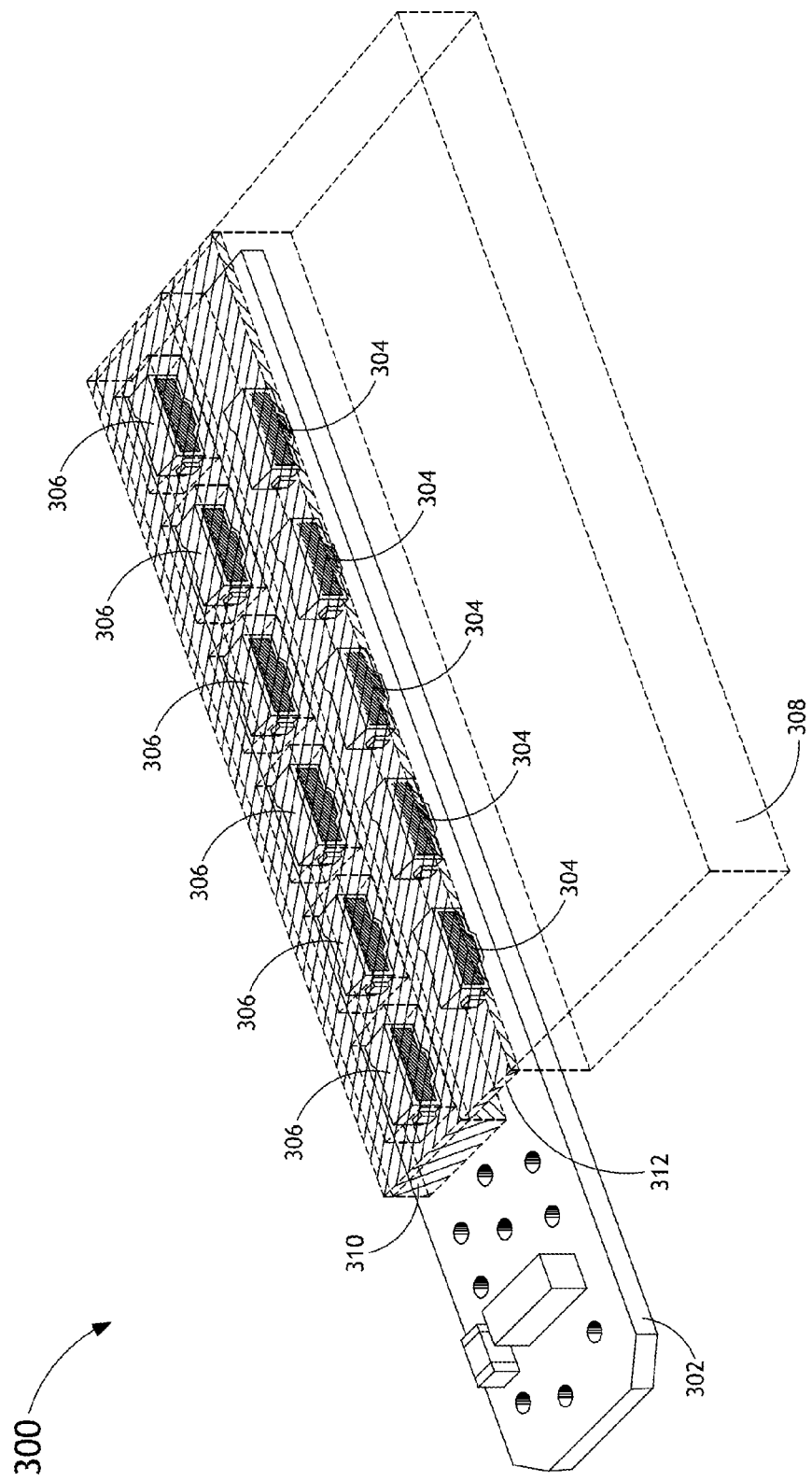
FIG. 3 is a partial isometric view illustrating another multimode edge-light in accordance with the present disclosure.
Figure 4:
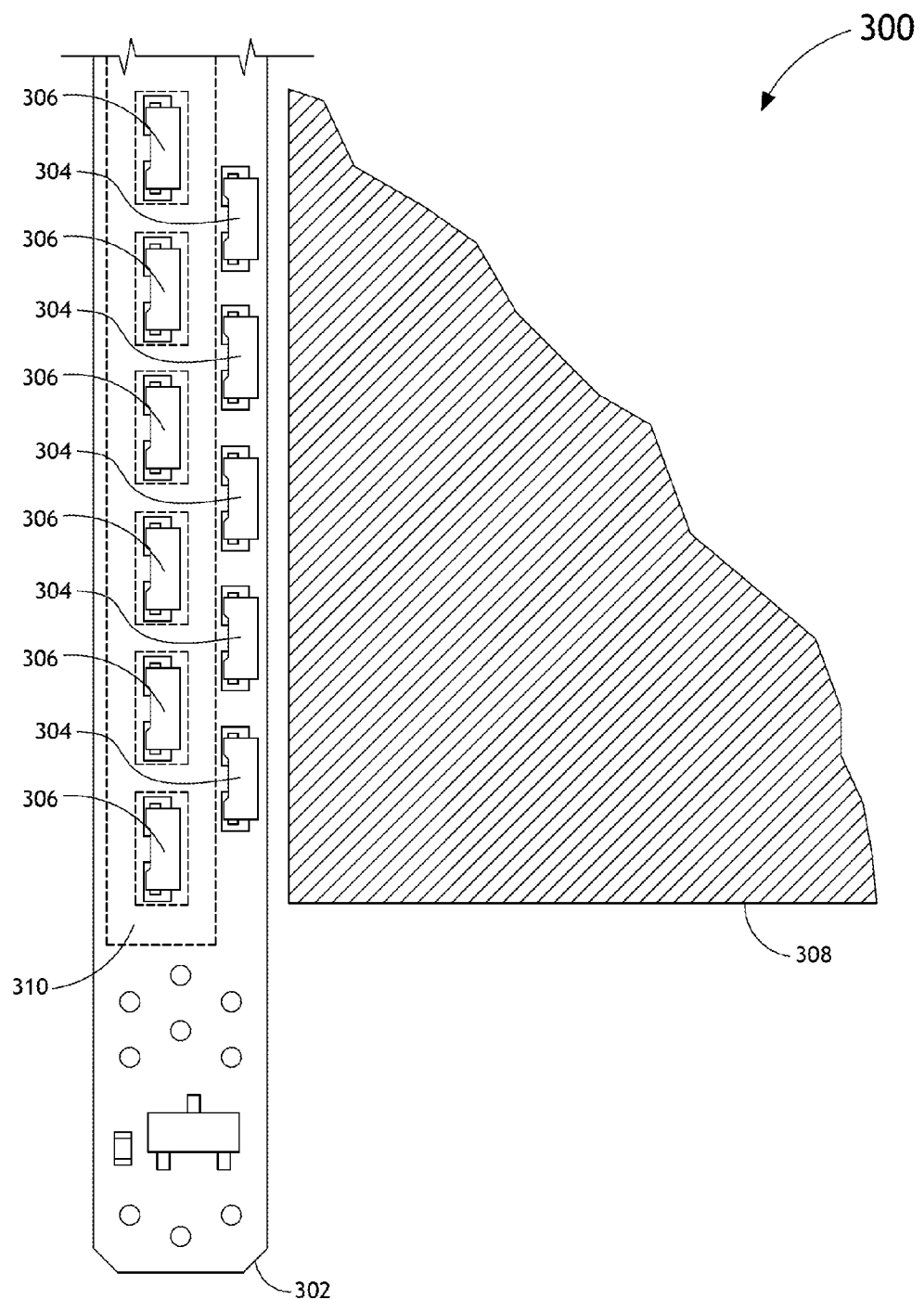
FIG. 4 is an aerial view of the multimode edge-light shown in FIG. 3.

The present disclosure is also directed to the multimode edge-light 300 shown in FIG. 3. FIG. 3 illustrates a partial isometric view illustrating a multimode edge-light 300 and FIG. 4 is an aerial view of the edge-light 300 shown in FIG. 3. The multimode edge-light 300 includes support base 302 for supporting and providing electrical connections for a first set of LED modules 304 electronically connected to the support base 302, as well as a second set of LED modules 306 electronically connected to the support base 302. The multimode edge-light 300 also includes a light guide 308 positioned parallel to the support base 302, and a filter 310 positioned on a surface of the support base 302. The filter 310 is configured for providing individual filtering of light from the second set of LED modules 306, without interfering with the light emitted from the first set of LED modules 304. The multimode edge-light 100 also includes a film 312 positioned over the first set of LED modules 304 and the second set of LED modules 306. When using the multimode edge-light 300, at least a portion of the first set of LED modules 304 and at least a portion of the second set of LED modules 306 are selectively energized for providing a plurality of operation modes to the multimode edge-light 300.

In the embodiment shown in FIGS. 3 and 4, the first set of LED modules 304 and the second set of LED modules 306 are arranged in two parallel rows. The first set of LED modules 304 is located adjacent to the light guide 308 in order to maximize the optical coupling between the LEDs and the light guide 308. The first set of LED modules 304 is configured for day time use, so it is desirable to maximize optical coupling to increase brightness during daylight hours. In one embodiment, the first set of LED modules 304 may be configured to provide brightness levels sufficient for day light operation.

The second set of LED modules 306 shown in FIGS. 3 and 4 are offset away from the light guide 308. This results in less efficient optical coupling for the second set of LED modules 306 into the light guide 308. The reduction is acceptable because the second set of LED modules 306 is configured for night time use and the required brightness levels are significantly lower than the requirements for daytime use.

Offsetting the second set of LED modules 306 away from the light guide 308 as shown in FIGS. 3 and 4 may allow the placement of additional LED modules along the edge of the light guide 308, thereby increasing the daytime brightness levels provided by the multimode edge-light 300. This can be desirable, as the space constraints along the edge of the light guide 308 and the support base 302 limit the total number of LED modules that may be included. By offsetting the second set of LED modules, additional space is freed up along the edge of the light guide for additional LED modules.

Figure 5:
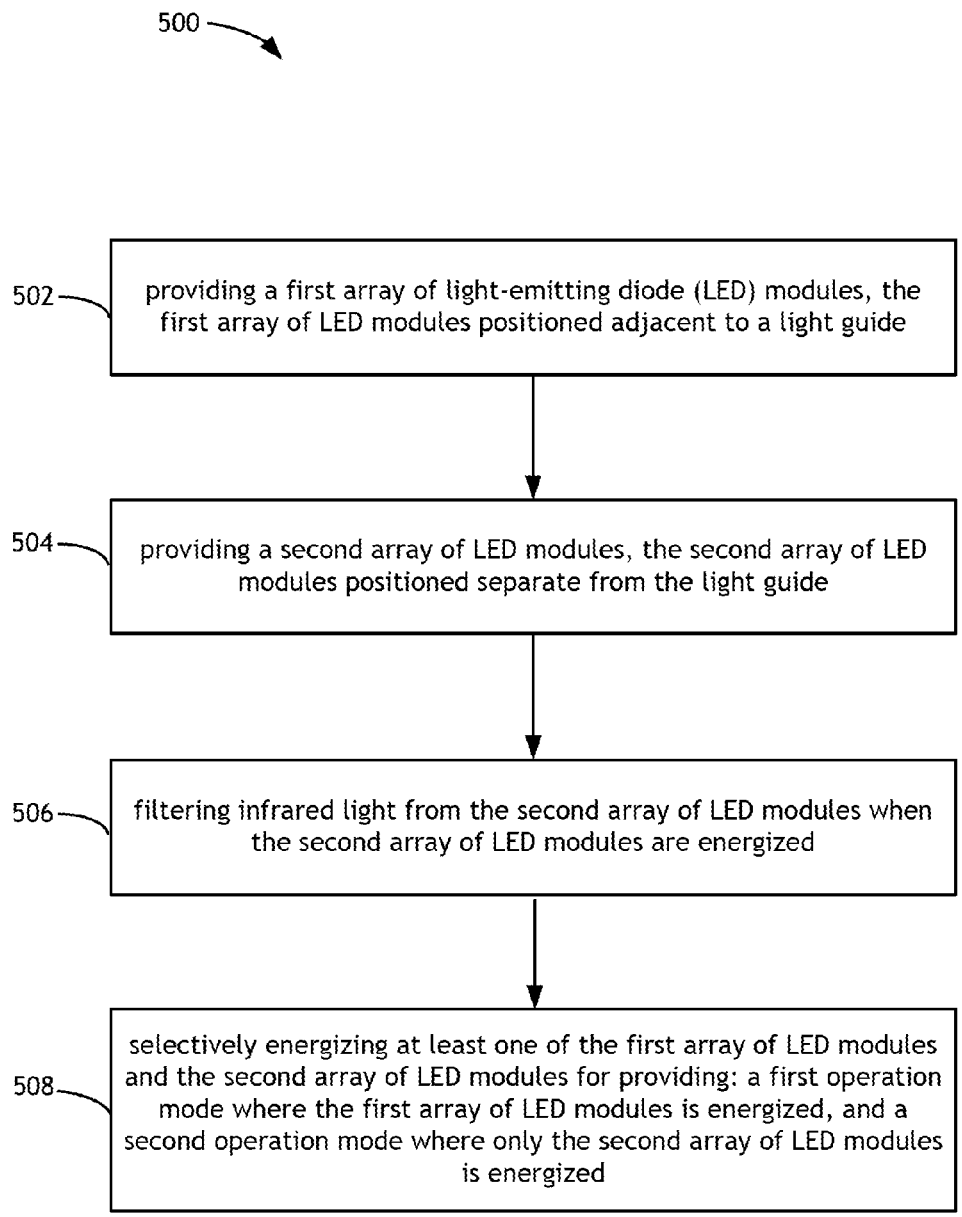
FIG. 5 is a flow chart illustrating a method for providing multimode backlighting in accordance with the present disclosure.

Referring now to FIG. 5, a method 500 for edge-lighting a display is provided. The method includes the step of providing a first array of light-emitting diode (LED) modules 502. The first array of LED modules is positioned adjacent to a light guide. The next step of the method 500 is to provide a second array of LED modules 504. The second array of LED modules is positioned separate from the light guide. The next step is to filter light from the second array of LED modules when the second array of LED modules is energized 506. Another step of the method 500 is to selectively energize at least one of the first array of LED modules and the second array of LED modules for providing: a first operation mode where the first array of LED modules is energized, and a second operation mode where only the second array of LED modules is energized.

In one embodiment of the method 500, both the first array of LED modules and the second array of LED modules are energized in the first operation mode. Energizing both arrays of LED modules at the same time can provide enhanced brightness during daylight operations.

The multimode configuration in accordance with the present disclosure is capable of delivering localized edge uniformity while addressing the need for lightweight and compact illumination, such as the illumination levels required for an ultrathin tablet display used in an avionics or ruggedized ground vehicle environment. The unfiltered first set of LED modules may boost output substantially in the absence of transmission losses normally incurred with single mode filtering. Similarly, the use of side emitting LEDs allows for a lighter weight solution for providing edge-lighting.

The multimode edge-light in accordance with the present disclosure may be utilized for edge-lighting of a light guide for the purpose of backlighting a display such as an ultrathin tablet display. Similarly, the multimode edge-light may be used in avionics and ground vehicle displays, monitors, other handheld display devices or the like. In addition, the multimode edge-light may also be appreciated in other areas of application including, but not limited to, illuminated control panels, electronic signage or the like that may require night vision compatibilities. The multimode edge-light in accordance with the present disclosure may be located along one side of the light guide, or along multiple sides depending on the system requirements.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A multimode edge-light, the multimode edge-light configured for directing light to a light guide, the multimode edge-light comprising:
   a support base;
   a first set of light-emitting diode (LED) modules electronically connected to the support base, the first set of LED located adjacent to the light guide, the first set of LED modules comprising side-emitting LEDs;
   a second set of LED modules electronically connected to the support base, the second set of LED modules positioned separate from the light guide, the second set of LED modules comprising side-emitting LEDs;
   a filter positioned on a surface of the support base, the filter configured for filtering light from the second set of LED modules only;
   wherein at least a portion of the first set of LED modules and at least a portion of the second set of LED modules are selectively energized for providing a plurality of operation modes to the multimode edge-light.

2. The multimode edge-light of claim 1, further comprising a light leak blocking film positioned over the first set of LED modules and the second set of LED modules.

3. The multimode edge-light of claim 1, wherein only the first set of LED modules is energized in a first operation mode.

4. The multimode edge-light of claim 1, wherein only the second set of LED modules is energized in a second operation mode.

5. The multimode edge-light of claim 1, wherein the first set of LED modules and at least a portion of the second set of LED modules are energized in a third operation mode.

6. The multimode edge-light of claim 1, wherein the first set of LED modules and the second set of LED modules are distributed in two parallel lines along the support base.

7. The multimode edge-light of claim 1, wherein the first set of LED modules and the second set of LED modules are interleaved along the support base.

8. The multimode edge-light of claim 1, wherein the filter comprises at least one of: an absorptive infrared filter and a dichroic thin film filter.

9. A multimode edge-light for illuminating a tablet display, comprising:
   a support base;
   a light guide;
   a first set of side emitting light-emitting diode (LED) modules electronically connected to the support base, the first set of side emitting LED modules located adjacent to the light guide;
   a second set of side emitting LED modules electronically connected to the support base, the second set of side emitting LED modules offset away from the light guide;
   a filter positioned on a surface of the support base correlating to the second set of side emitting LED modules; the filter configured for filtering infrared light from the second set of side emitting LED modules only;
   wherein the first set of side emitting LED modules and the second set of side emitting LED modules are positioned on the support base to provide a uniform illumination across an edge of the tablet display in a plurality of operation modes.

10. The multimode edge-light of claim 9, further comprising a light leak blocking film positioned over the first set of side emitting LED modules and the second set of side emitting LED modules.

11. The multimode edge-light of claim 9, wherein only the first set of side emitting LED modules is energized in a first operation mode.

12. The multimode edge-light of claim 9, wherein only the second set of side emitting LED modules is energized in a second operation mode.

13. The multimode edge-light of claim 9, wherein the first set of side emitting LED modules and at least a portion of the second set of side emitting LED modules are energized in a third operation mode.

14. The multimode edge-light of claim 9, wherein the filter comprises at least one of: an absorptive infrared filter and a thin film dichroic filter.

15. The multimode edge-light of claim 9, wherein the support base comprises a printed circuit board for providing electricity and control signals to the first set of side emitting LED modules and the second set of side emitting LED modules.

16. A method for providing backlighting to a display, the method comprising:
   providing a first array of light-emitting diode (LED) modules, the first array of LED modules positioned adjacent to a light guide, the first array of LED modules comprising side-emitting LEDs;
   providing a second array of LED modules, the second array of LED modules positioned separate from the light guide, the second array of LED modules comprising side-emitting LEDs;
   filtering infrared light from the second array of LED modules when the second array of LED modules is energized;
   selectively energizing at least one of the first array of LED modules and the second array of LED modules for providing: a first operation mode where the first array of LED modules is energized, and a second operation mode where only the second array of LED modules is energized.

17. The method of claim 16, wherein the first array of LED modules and the second array of LED modules are both energized in the first operation mode.

18. The method of claim 16, wherein the filtering light from the second array of LED modules when the second array of LED modules are energized includes filtering the light using at least one of: an absorptive infrared filter and a thin film dichroic filter.

* * * * *